UNITED STATES PATENT OFFICE.

CHARLES S. BRADLEY, OF NEW YORK, N. Y.

PRODUCTION OF SODIUM HYDROXID.

1,249,314.

Specification of Letters Patent. Patented Dec. 11, 1917.

No Drawing. Application filed February 26, 1915. Serial No. 10,733.

*To all whom it may concern:*

Be it known that I, CHARLES S. BRADLEY, a citizen of the United States, residing in the city, county, and State of New York, have invented certain new and useful Improvements in the Production of Sodium Hydroxid, of which the following is a full and clear specification.

My invention relates in general to the production of sodium hydroxid and allied products and has for its object to produce such products with the aid of materials which are for the most part inexpensive, and to regenerate and conserve the more expensive reagents and materials employed in the process. According to my process I employ a cheap reagent for the greater portion of the causticizing step and beyond the ability of this reagent to perform the causticizing step I employ a more expensive and powerful reagent which is regenerated over and over again in the process and which hence may be employed without loss of economy. In this way I gain a substantially complete efficiency of the causticizing operation, and obtain a high degree of purity in the product.

The invention is applicable as an adjunct, to, for example, the ammonia process for the production of sodium carbonate and will be described with respect thereto in order that the principles of the invention may clearly appear. The embodiment which I shall describe includes the production of caustic soda from sodium carbonate.

Ammonium chlorid and barium carbonate when subjected to the proper temperature and pressure (about 90° C. to 104 C. at atmospheric pressure) in the presence of water give rise to the production of a barium chlorid solution and ammonia gas, carbon dioxid and water, as follows:

I. 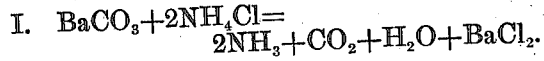

The water is omitted in the above equation, for simplicity. This reaction is endothermic and absorbs in the neighborhood of 17000 heat units. In order to avoid the inefficiency of supplying these heat units from a source outside of the system, I may employ a heat conservation process in which advantage is taken of the heat envolved in a subsequent exothermic chemical action, to supply the rejected heat of the subsequent reaction to the materials taking part in the endothermic action. Such a conservation process forms the subject matter of another application Serial No. 10,732, filed Feb. 26th, 1915, and is not claimed, *per se,* herein. I may briefly state, however, that it involves the performance of the two reactions in heat conductive relation with each other, the gaseous products from the first reaction being pumped at higher pressure and temperature into an exothermic reaction chamber in heat conductive relation with the first reaction, where the heat units previously absorbed are substantially restored. The higher temperature and pressure give rise to the subsequent exothermic reaction which in the present case may be represented as follows:

II. 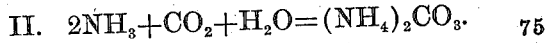

In the formation of the ammonium carbonate, a quantity of chemical heat is given off which is substantially equivalent to that absorbed in the first reaction and this heat is transferred thereto and thus conserved within the system. The ammonium carbonate is obtained in the form of a solution in the second chamber and is subjected to the action of sodium chlorid for the production of sodium bicarbonate and ammonium chlorid. This step may be performed in conjunction with the corresponding step in the ammonia soda process in which case the reaction may be represented as follows:

III. 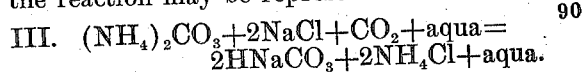

The ammonium chlorid is thus regenerated for the first reaction. The sodium bicarbonate after treatment by well known methods to reduce it to normal carbonate is according to the present embodiment of my invention subjected to the causticizing step for the production of caustic soda. This causticizing step is for the greater part accomplished by the aid of lime, as follows:

IV. 

The calcium hydroxid will causticize about 90% of the sodium carbonate and to complete the production of caustic soda and obtain a substantially pure product I first filter off the solution and then treat it with barium hydroxid. Considering only the remaining sodium carbonate in the solution the reaction may be represented as follows:

V. $Na_2CO_3 + BaO_2H_2 = BaCO_3 + 2NaOH$.

The barium carbonate is thus regenerated for the first reaction. The barium hydroxid employed in this completion of the causticizing step is produced within the system from the by-product barium chlorid of the first reaction reacting with an equivalent quantity of the caustic soda, produced by the process. This reaction may be represented as follows:

VI. $BaCl_2 + 2NaOH = BaO_2H_2 + 2NaCl$.

It will be seen from the above example of my invention that sodium chlorid and limestone are the only raw materials, excepting water represented in the chemical process. The barium carbonate and ammonium chlorid are substantially all regenerated, and the sodium hydroxid or caustic soda represents only the consumption of common salt, lime and water. The product, caustic soda, obtained in the manner described, is the result of a substantially complete reaction, being correspondingly pure and representing approximately maximum efficiency of production. The requirement for supplying considerable outside heat to support endothermic reaction between barium carbonate and sodium chlorid is substantially avoided by conducting this operation in heat conductive relation with a subsequent exothermic production of ammonium carbonate, while at the same time the occurrence of objectionable high temperature and the discharge of waste heat from the system with consequent loss of efficiency connected with the production of the ammonium carbonate is substantially avoided. The sodium hydroxid is obtained as a product of a substantially complete chemical action between the sodium carbonate and barium hydroxid, both the calcium carbonate produced in the major portion of the causticizing step and the barium carbonate produced in the completion of this step being highly insoluble salts and thus insuring high efficiency and complete separation by filtration or otherwise of the caustic soda from the by-products of the reactions.

I claim:

1. The method of producing soda products which comprises causing a reaction between an alkaline earth carbonate and ammonium chlorid to produce ammonia gas, carbon dioxid and water, producing ammonium carbonate from said products, and utilizing the ammonium carbonate with sodium chlorid and carbon dioxid in the ammonium soda process to obtain sodium carbonate.

2. The method of producing soda products which comprises utilizing barium carbonate and ammonium chlorid as the starting materials in the production of ammonium carbonate, utilizing the ammonium carbonate with sodium chlorid and carbon dioxid for obtaining sodium carbonate and regenerating ammonium chlorid, causticizing the carbonate with barium hydroxid, whereby barium carbonate is regenerated for the first reaction, and securing the required barium hydroxid from the barium chlorid of the first reaction by means of caustic soda obtained by the method.

3. The method of producing soda products which comprises utilizing barium carbonate and ammonium chlorid as starting material for obtaining ammonium carbonate, utilizing the ammonium carbonate with sodium chlorid and carbon dioxid for obtaining sodium carbonate and regenerating the ammonium chlorid, causticizing the sodium carbonate first with calcium hydroxid and then with barium hydroxid, producing the barium hydroxid for said causticizing step from barium chlorid of the first reaction by means of a portion of the caustic soda so produced.

CHARLES S. BRADLEY.

Witnesses:
OCTAVIUS KNIGHT,
LOUELLA F. LITTLE.